(12) United States Patent  
Kobayashi

(10) Patent No.: US 7,733,577 B2  
(45) Date of Patent: Jun. 8, 2010

(54) LENS BARREL

(75) Inventor: Futoshi Kobayashi, Ohta-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/674,092

(22) Filed: Feb. 12, 2007

(65) Prior Publication Data

US 2007/0195429 A1 Aug. 23, 2007

(30) Foreign Application Priority Data

Feb. 17, 2006 (JP) ............... 2006-041546

(51) Int. Cl.
  *G02B 15/14* (2006.01)
  *G02B 7/02* (2006.01)
(52) U.S. Cl. ............... 359/700; 359/699; 359/828
(58) Field of Classification Search ............... 359/694, 359/699, 700–701, 703–704, 813, 822–823, 359/828
  See application file for complete search history.

(56) References Cited

U.S. PATENT DOCUMENTS

| 4,707,083 | A | * | 11/1987 | Iizuka et al. | ............... | 359/700 |
|---|---|---|---|---|---|---|
| 5,079,575 | A | * | 1/1992 | Nii et al. | ............... | 396/63 |
| 5,210,644 | A | * | 5/1993 | Nomura | ............... | 359/694 |
| 5,268,794 | A | * | 12/1993 | Chan | ............... | 359/699 |
| 2003/0081329 | A1 | * | 5/2003 | Nomura et al. | ............... | 359/700 |
| 2005/0111113 | A1 | * | 5/2005 | Shirie | ............... | 359/701 |

FOREIGN PATENT DOCUMENTS

JP   62-265900   11/1987

* cited by examiner

*Primary Examiner*—Scott J Sugarman
*Assistant Examiner*—Dawayne A Pinkney
(74) *Attorney, Agent, or Firm*—Canon USA Inc IP Div

(57) ABSTRACT

A lens barrel having a configuration lending itself to effectively reducing the size thereof and ensuring appropriate and safe operation thereof. The lens barrel includes a guiding portion provided for a lens holding member for guiding a cam follower in a radial direction of a cam barrel; a tabular elastic member provided for the lens holding member for urging the cam follower in a guiding direction of the guiding portion; and a regulating member limiting the transfer of the cam follower that is to be moved in a direction opposite to the urging direction by the elastic member. The regulating member is configured to be brought into contact with a predetermined portion of the lens holding member.

6 Claims, 5 Drawing Sheets

LENS BARREL

BACKGROUND OF THE INVENTION

1. Field of the Invention

The present invention relates to lens barrels having cam barrels with cams and cam followers engaged with the cams for transferring lens holders via the engagement between the cams and the cam followers.

2. Description of the Related Art

In order to change focal lengths of optical systems of zoom lenses in lens barrels, a mechanism including cams and cam followers engaged with the cams for transferring lenses that are integrated with the cam followers is in widespread use. More specifically, for example, a cylindrical cam barrel including three cams having the same locus formed on the inner surface thereof at regular intervals and a lens holding member including cam followers corresponding to the cams and holding a lens in the center thereof are engaged with each other via the cams. The lens holding member is supported by the cam barrel so as not to be rotatable and so as to be movable using the cams in connection with the rotation of the cam barrel.

In this mechanism, backlash between the cams and the cam followers can cause degradation of captured images and blurring of images during zooming due to wobbling of the lens. However, without backlash, the load required for rotating the cam barrel can be increased by the friction between the cams and the cam followers, and abrasion of the cams and the cam followers can be increased due to the friction.

In order to solve these problems, a method for urging a cam follower toward a cam using an elastic force of an elastic member has been discussed. According to this method, backlash can be reliably eliminated, and the force for urging the cam follower toward the cam can be adjusted using the elastic force of the elastic member. With this, the driving load can be reduced, and the abrasion can also be reduced.

In order to urge the cam follower, a method in which the cam follower is guided so as to be reciprocable and an end of the cam follower is pressed toward the cam using a compression spring has been discussed.

However, according to the method in which the end of the cam follower is pressed using the compression spring, the compression spring is disposed so as to extend in a direction of urging the cam follower, and therefore, at least a structure accommodating the compression spring in the urging direction is required. Therefore, the lens holding member cannot be reduced in size in a radial direction thereof.

According to Japanese Registered Utility Model No. 2567258, a plate spring is used as the elastic member for urging the cam follower. A portion of the cam follower is narrowed, and the plate spring is hooked on the narrowed portion. Since the engaging portion between the cam follower and the lens holding member extends in a radial direction of the lens holding member, the lens holding member cannot be reduced in size in a radial direction thereof. Moreover, the length of the engaging portion between the cam follower and the lens holding member needs to be increased in order to prevent the cam follower from falling off the lens holding member. This also prevents the reduction in the size of the lens holding member in a radial direction thereof. Moreover, falling of the cam follower from the lens holding member cannot be completely prevented even when the length of the engaging portion between the cam follower and the lens holding member is increased.

SUMMARY OF THE INVENTION

The present invention is directed to a lens barrel having a configuration that lends itself to effectively reducing the size thereof and ensuring appropriate and safe operation thereof.

According to one aspect of the present invention, a lens barrel for transferring a lens holding member in a light axis direction via a cam follower engaged with a cam of a cam barrel includes a guiding portion provided for the lens holding member for guiding the cam follower in a radial direction of the cam barrel; a tabular elastic member provided for the lens holding member for urging the cam follower in a guiding direction of the guiding portion; and a regulating member limiting the transfer of the cam follower that is to be moved in a direction opposite to the urging direction by the elastic member when the regulating member is brought into contact with a predetermined portion of the lens holding member. When the regulating member is not limiting the movement of the cam follower, a clearance is defined between the regulating member and the predetermined portion of the lens holding member.

According to the above-described aspect of the present invention, the lens holding member includes the tabular elastic member for urging the cam follower in a radial direction of the cam barrel when the cam follower is brought into contact with the cam using the elastic member. Thus, the lens holding member can be effectively reduced in size. In this case, the regulating member regulates the transfer of the cam follower in a direction opposite to the urging direction of the elastic member. With this, the cam follower does not fall off the lens holding member after being assembled. With these components, size reduction of the lens holding member and prevention of falling of the cam follower can be achieved at the same time.

The above features of the invention will become more apparent from the following detailed description taken in conjunction with the accompanying drawings.

DESCRIPTION OF THE EMBODIMENTS

Figure 1:
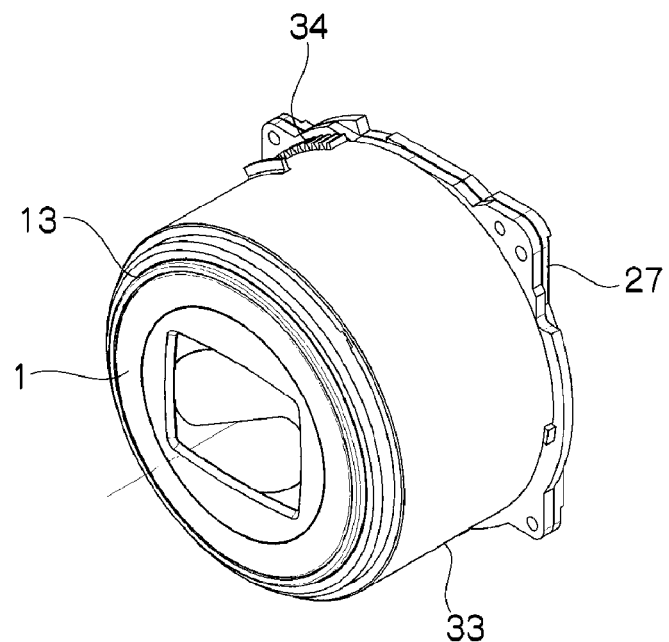
FIG. 1 is a perspective view of a lens barrel according to an exemplary embodiment of the present invention.
Figure 2:
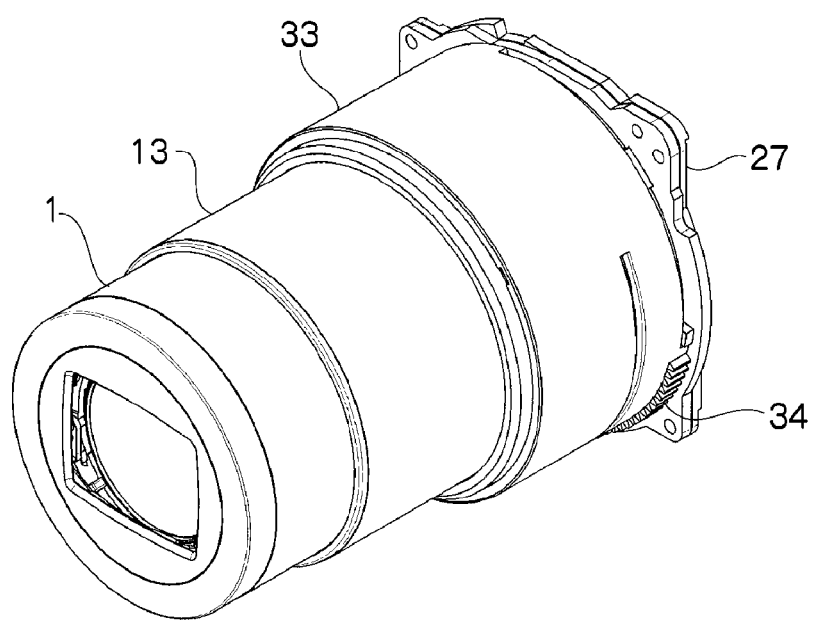
FIG. 2 is a perspective view of the lens barrel during image capturing according to the exemplary embodiment of the present invention.

An exemplary embodiment of the present invention will now be described in detail with reference to the drawings. FIG. 1 is a perspective view of a lens barrel according to an exemplary embodiment of the present invention. The lens barrel shown in FIG. 1 is collapsed, and is not used for image capturing in this state. FIG. 2 illustrates the lens barrel during image capturing. In this exemplary embodiment, urging of cam followers toward cams in such a collapsible lens barrel will be described.

Figure 3:
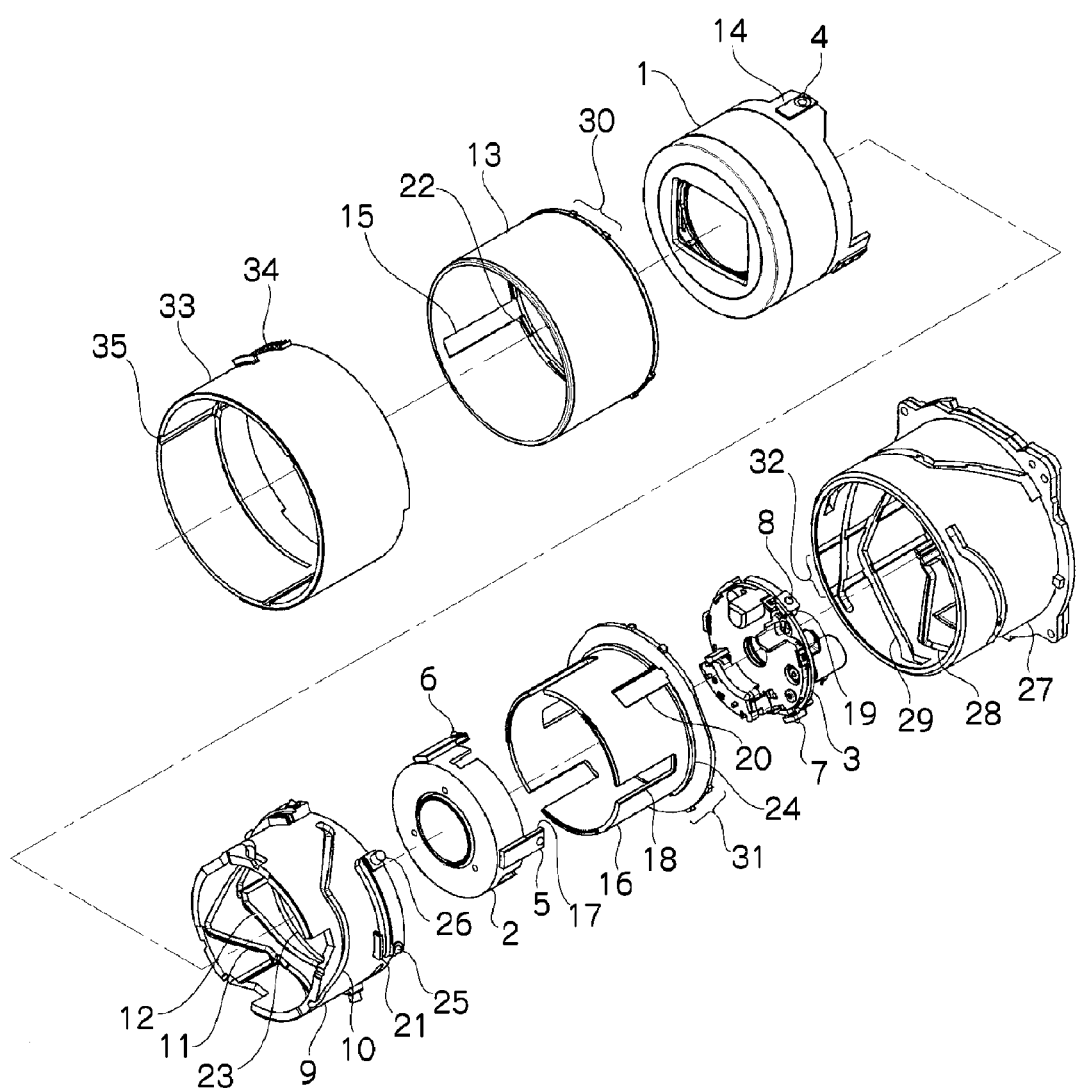
FIG. 3 is an exploded perspective view of the lens barrel according to the exemplary embodiment of the present invention.

FIG. 3 is an exploded perspective view of the lens barrel according to the exemplary embodiment of the present invention. A cylindrical first holder 1 retains a first lens group of an optical system according to the exemplary embodiment of the present invention. Similarly, a second holder 2 retains a second lens group, and a third holder 3 retains a third lens group, an aperture, and a shutter.

Three first cam followers 4 protrude inward from the circumference of the first holder 1 toward the central axis of the first holder 1 at regular intervals, the circumference having the central axis of the lens barrel as the center thereof. Two fixed second cam followers 5 are fixed to the second holder 2, and a movable second cam follower 6 is supported by the second holder 2 so as to be movable. These three cam followers are disposed on the circumference of the second holder 2 at regular intervals, the circumference having the central axis of the second holder 2 as the center thereof. Two fixed third cam followers 7 are fixed to the third holder 3, and a movable third cam follower 8 is supported by the third holder 3 so as to be movable. These three cam followers are disposed on the circumference of the third holder 3 at regular intervals, the circumference having the central axis of the third holder 3 as the center thereof.

A cylindrical cam barrel 9 has cams on the outer and inner surfaces thereof for transferring the first holder 1, the second holder 2, and the third holder 3. Three first cams 10 are engraved on the outer surface of the cam barrel 9, and are engaged with the first cam followers 4. The first cams 10 corresponding to the first cam followers 4 are disposed on the circumference of the cam barrel 9 at regular intervals. Three second cams 11 are engraved on the inner surface of the cam barrel 9, and are engaged with the fixed second cam followers 5 and the movable second cam follower 6. The second cams 11 corresponding to the fixed second cam followers 5 and the movable second cam follower 6 are disposed on the circumference of the cam barrel 9 at regular intervals. Three third cams 12 are engraved on the inner surface of the cam barrel 9, and are engaged with the fixed third cam followers 7 and the movable third cam follower 8. The third cams 12 corresponding to the fixed third cam followers 7 and the movable third cam follower 8 are disposed on the circumference of the cam barrel 9 at regular intervals.

Three first keys 14 protrude from the outer surface of the first holder 1 at regular intervals. A linearly driven outer barrel 13 has three first linear grooves 15 recessed in the inner surface of the outer barrel 13. The first linear grooves 15 are parallel to the central axis of the lens barrel, and are engaged with the first keys 14.

Three second keys 17, which correspond to the two fixed second cam followers 5 and the movable second cam follower 6, are disposed on the outer surface of the second holder 2. A linearly driven inner barrel 16 has three second linear grooves 18 formed by cutting the cylindrical surface of the inner barrel 16. The second linear grooves 18 are parallel to the central axis of the lens barrel, and are engaged with the corresponding second keys 17. Three third keys 19, which correspond to the two fixed third cam followers 7 and the movable third cam follower 8, are disposed on the outer surface of the third holder 3. Three third linear grooves 20 are formed by cutting the cylindrical surface of the inner barrel 16. The third linear grooves 20 are parallel to the central axis of the lens barrel, and are engaged with the corresponding third keys 19.

A first slit 21 parallel to a surface that is perpendicular to the central axis of the lens barrel is formed on the outer surface of the cam barrel 9. A first rib 22 parallel to the surface that is perpendicular to the central axis of the lens barrel is formed on the inner surface of the outer barrel 13. The first rib 22 on the outer barrel 13 is engaged with the first slit 21 on the cam barrel 9 in a bayonet-coupling manner. A second slit 23 parallel to the surface that is perpendicular to the central axis of the lens barrel is formed on the inner surface of the cam barrel 9. A second rib 24 parallel to the surface that is perpendicular to the central axis of the lens barrel is formed on the outer surface of the inner barrel 16. The second rib 24 on the inner barrel 16 is engaged with the second slit 23 on the cam barrel 9 in a bayonet-coupling manner.

Three fourth cam followers 25 and three driving pins 26 protrude outward from the outer surface of the cam barrel 9 in radial directions. Both the fourth cam followers 25 and the driving pins 26 are disposed at regular intervals.

A fixed barrel 27 is held so as to be fixed with respect to an image pickup element (not shown). Three fourth cams 28 are engraved on the inner surface of the fixed barrel 27 at regular intervals, and are engaged with the corresponding fourth cam followers 25. Three hole-shaped fifth cams 29 extending from the inner surface to the outer surface of the fixed barrel 27 and having the same locus as the fourth cams 28 are formed in the fixed barrel 27 at regular intervals. The open width of the fifth cams 29 is larger than the maximum width of the driving pins 26 such that the driving pins 26 can pass through the corresponding fifth cams 29 without sliding resistance.

Three pairs of first linear driving keys 30, each pair being composed of two protrusions, protrude from the outer surface of the outer barrel 13 at regular intervals. Three pairs of second linear driving keys 31, each pair being composed of two protrusions, protrude from the contour of the inner barrel 16 at regular intervals. Three pairs of linear driving grooves 32, each pair being composed of two linear driving grooves, are recessed in the inner surface of the fixed barrel 27. The linear driving grooves 32 are parallel to the central axis of the lens barrel, and are engaged with the first linear driving keys 30 and the second linear driving keys 31.

A cylindrical driving barrel 33 is fitted onto the fixed barrel 27 so as to be rotatable. A gear 34 is formed at a position of the contour of the driving barrel 33. Driving grooves 35 parallel to the central axis of the lens barrel are recessed in the inner surface of the driving barrel 33, and are engaged with the driving pins 26 passing through the fifth cams 29.

Next, operations of the lens barrel having the above-described structure will be described. When a driving force is applied to the gear 34 by a driving source (not shown), the driving barrel 33 is rotated with respect to the fixed barrel 27. The bottom of the driving barrel 33 is in contact with a flange of the fixed barrel 27, and the top of the driving barrel 33 is in contact with a cover (not shown) such that the driving barrel 33 is not moved in a direction of the central axis of the lens barrel. The torque applied to the driving barrel 33 is also applied to the cam barrel 9 via the driving pins 26 engaged with the driving grooves 35. Since the fourth cam followers 25 of the cam barrel 9 are engaged with the fourth cams 28 of the fixed barrel 27, the cam barrel 9 is moved in the central axis direction of the lens barrel along the locus of the fourth cams 28 during the rotation thereof. At this time, the driving pins 26 are moved along the same locus as that of the fourth cam followers 25 during the rotation thereof. In this case, since the shapes of the locus of the fifth cams 29 and the fourth cams 28 are the same, the driving pins 26 can be operated without being brought into contact with the fixed barrel 27.

The outer barrel 13 is moved in the central axis direction of the lens barrel without the rotation thereof in connection with the transfer of the cam barrel 9 due to the engagement between the first rib 22 and the first slit 21 of the cam barrel 9 in a bayonet-coupling manner and the engagement between the first linear driving keys 30 and the linear driving grooves 32 of the fixed barrel 27. Similarly, the inner barrel 16 is moved in the central axis direction of the lens barrel without the rotation thereof in connection with the transfer of the cam barrel 9 due to the engagement between the second rib 24 and the second slit 23 of the cam barrel 9 in a bayonet-coupling manner and the engagement between the second linear driving keys 31 and the linear driving grooves 32 of the fixed barrel 27.

Next, operations of the holders for the lens groups will be described. The first holder 1 can be moved only in the central axis direction of the lens barrel together with the outer barrel 13 since the first keys 14 of the first holder 1 are engaged with the first linear grooves 15 of the outer barrel 13. Moreover, the first holder 1 is moved in the central axis direction of the lens barrel along the locus of the first cams 10 of the cam barrel 9 in connection with the rotation of the cam barrel 9 due to the engagement between the first cam followers 4 and the first cams 10.

The second holder 2 can be moved only in the central axis direction of the lens barrel together with the inner barrel 16 since the second keys 17 of the second holder 2 are engaged with the second linear grooves 18 of the inner barrel 16. Moreover, the second holder 2 is moved in the central axis direction of the lens barrel along the locus of the second cams 11 of the cam barrel 9 in connection with the rotation of the cam barrel 9 due to the engagement of the fixed second cam followers 5 and the movable second cam follower 6 with the second cams 11.

Similarly, the third holder 3 can be moved only in the central axis direction of the lens barrel together with the inner barrel 16 since the third keys 19 of the third holder 3 are engaged with the third linear grooves 20 of the inner barrel 16. Moreover, the third holder 3 is moved in the central axis direction of the lens barrel along the locus of the third cams 12 of the cam barrel 9 in connection with the rotation of the cam barrel 9 due to the engagement of the fixed third cam followers 7 and the movable third cam follower 8 with the third cams 12.

Figure 4:
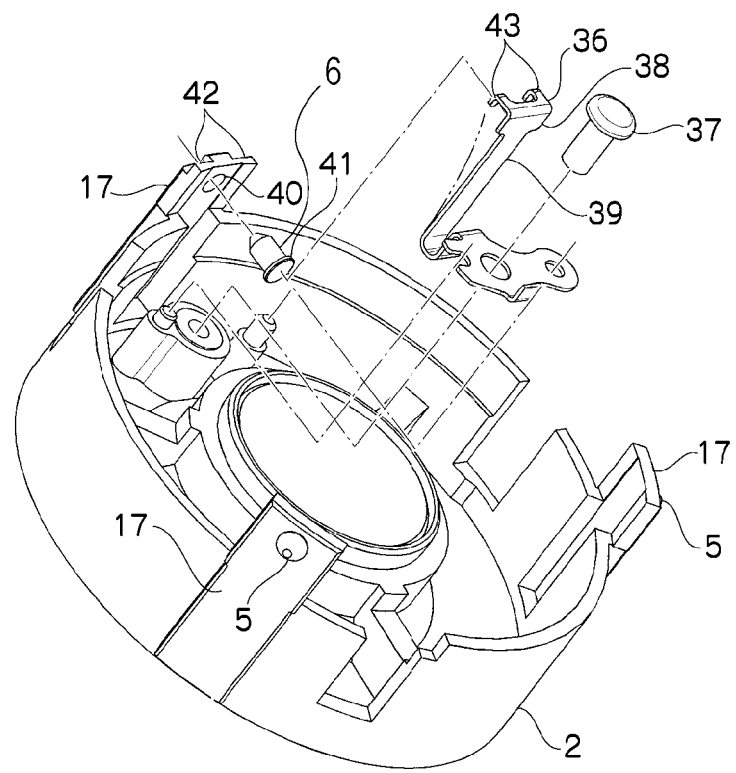
FIG. 4 is an exploded perspective view of a second holder of the lens barrel according to the exemplary embodiment of the present invention.

Next, the movable second cam follower 6 and the movable third cam follower 8 will be described. FIG. 4 is an exploded perspective view of the second holder 2. In FIG. 4, a plate spring 36 composed of stainless steel serves as an elastic member that urges the movable second cam follower 6. The plate spring 36 is fixed to the second holder 2 using a screw 37. The movable second cam follower 6 is urged by an urging portion 38 of the plate spring 36. Reference number 39 denotes an arm of the plate spring 36.

The plate spring 36 shown in FIG. 4 is in a state where it is assembled and loaded. In its natural state, the arm 39 of the plate spring 36 is bent outward so as to urge the movable second cam follower 6 outward in a radial direction. With this, the movable second cam follower 6 is pressed toward the corresponding second cam 11 so as to be engaged with the second cam 11 without backlash.

The movable second cam follower 6 is fitted into a first hole 40 for guiding the movable second cam follower 6 in a radial direction. The movable second cam follower 6 has a flange 41 protruding in a direction orthogonal to the guiding direction of the first hole 40. The movable second cam follower 6 does not fall off due to the contact of the flange 41 with the second holder 2 even when the movable second cam follower 6 is urged by the plate spring 36 outward in a radial direction.

Figure 5:
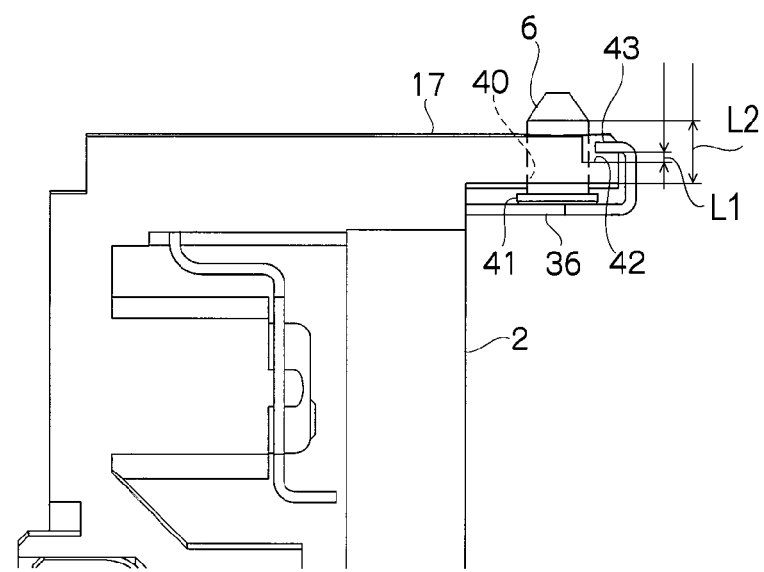
FIG. 5 is a cross-sectional view of the second holder of the lens barrel according to the exemplary embodiment of the present invention.

Reference numbers 42 denote cutoff surfaces formed on the second holder 2. Reference numbers 43 denote projections formed at an end of the plate spring 36. FIG. 5 is a cross-sectional view illustrating portions around the movable second cam follower 6. When the movable second cam follower 6 is subjected to a force directed inward in a direction opposite to a radial direction and is moved inward against the spring force of the plate spring 36, the plate spring 36 is bent inward. However, bending of the plate spring 36 can be regulated due to the contact of the projections 43 with the cutoff surfaces 42.

As shown in FIG. 5, a length L1 is clearance between the projections 43 and the cutoff surfaces 42. The length L1 is shorter than a length L2 required for the movable second cam follower 6 to fall off the first hole 40. Thus, the movable second cam follower 6 does not fall off after being assembled. The movable second cam follower 6 can be subjected to a force inward in a direction opposite to a radial direction when the second holder 2 is assembled, when the lens barrel is dropped, when the lens barrel is vibrated, or the like.

Figure 6:
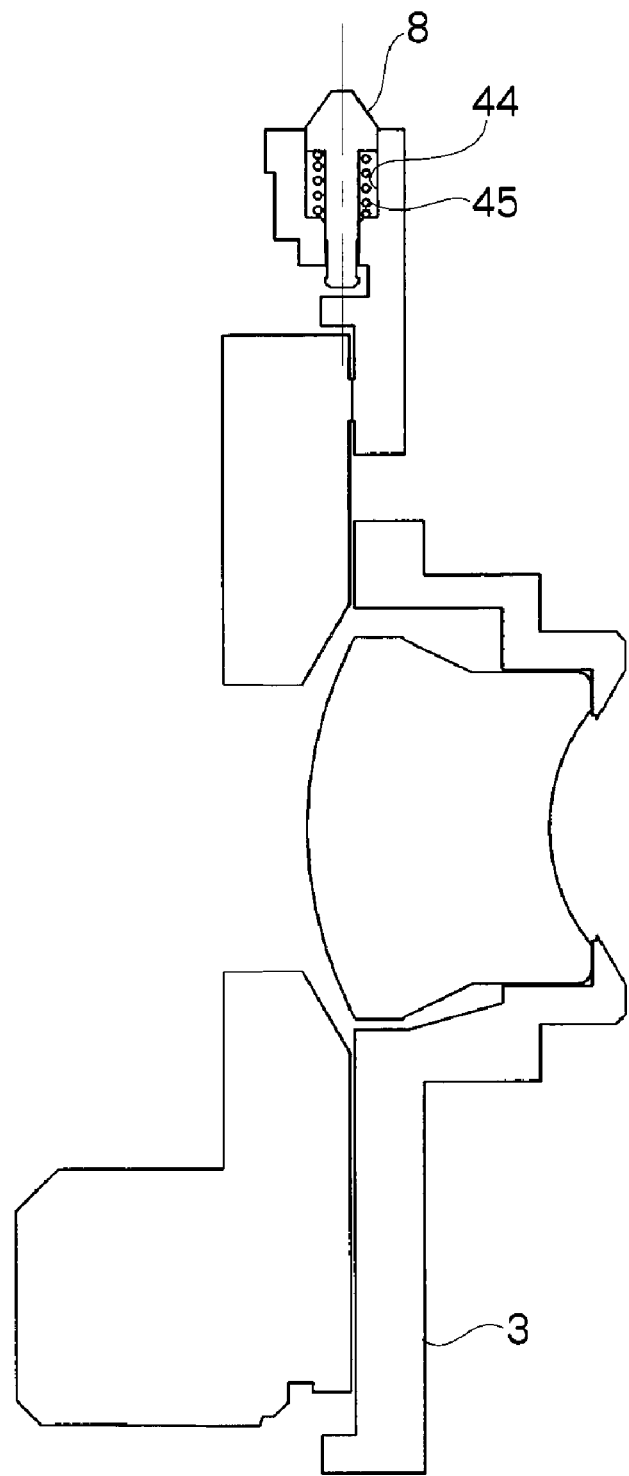
FIG. 6 is a cross-sectional view of a third holder of the lens barrel according to the exemplary embodiment of the present invention.

FIG. 6 is a cross-sectional view illustrating portions around the movable third cam follower 8. In FIG. 6, the movable third cam follower 8 is fitted into a second hole 44 for guiding the movable third cam follower 8 in a radial direction. A compression spring 45 is also disposed inside the second hole 44, and a small-diameter portion of the movable third cam follower 8 passes through the compression spring 45. The movable third cam follower 8 is urged outward in a radial direction by the compression spring 45, and is pressed toward the corresponding third cam 12 of the cam barrel 9, thereby being engaged with the third cam 12 without backlash.

Figure 7:
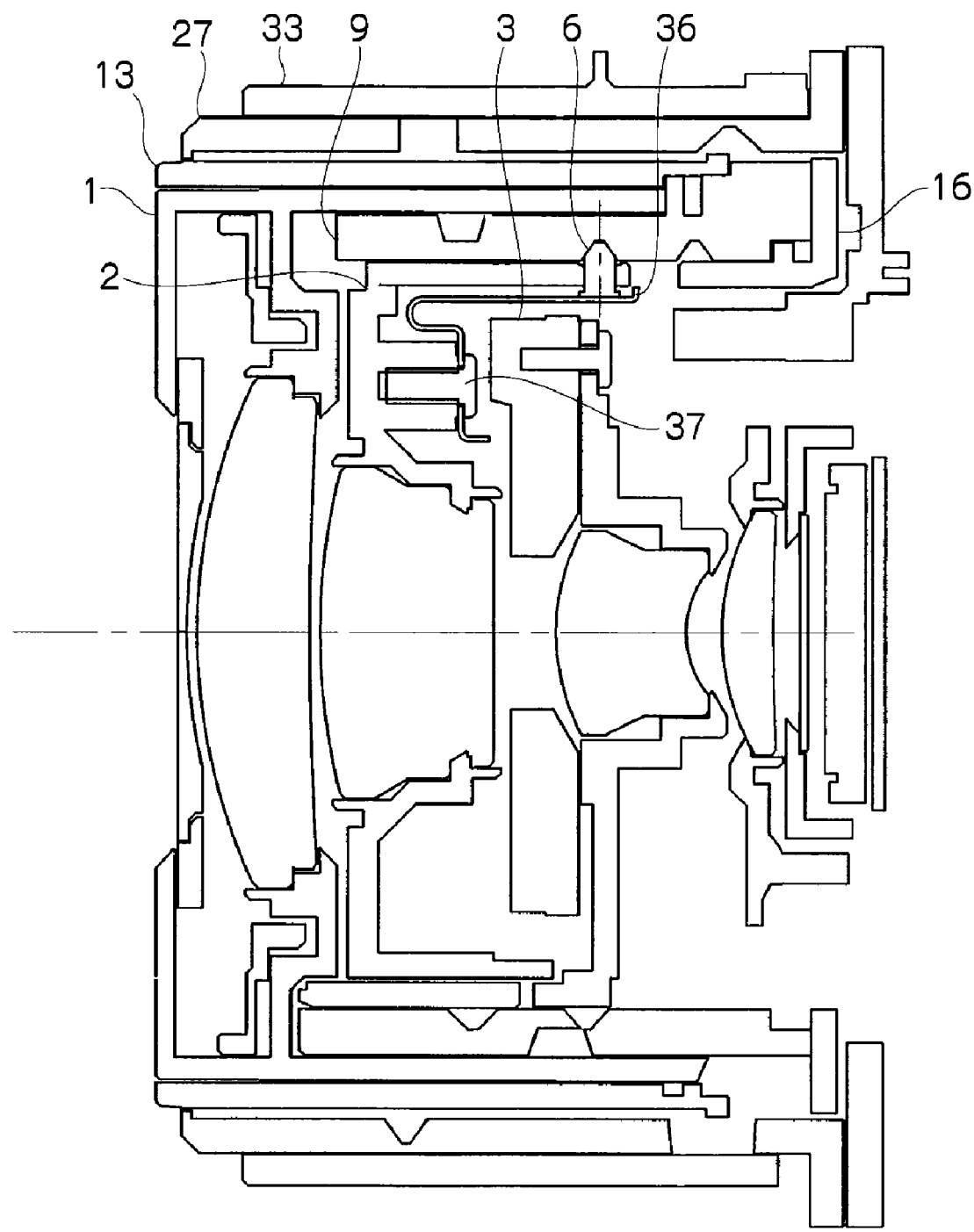
FIG. 7 is a cross-sectional view of the lens barrel when it is collapsed according to the exemplary embodiment of the present invention.

When the movable second cam follower 6 and the movable third cam follower 8 are compared with each other, the movable second cam follower 6 occupies a smaller space in a radial direction, and the movable third cam follower 8 occupies a smaller space in the central axis direction of the lens barrel. FIG. 7 is a cross-sectional view of the collapsed lens barrel taken along a line passing through the movable second cam follower 6. As shown in FIG. 7, the second holder 2 is disposed over the third holder 3 when it is accommodated in the lens barrel according to the exemplary embodiment of the present invention. In a lens barrel having such a structure, the space inside the lens barrel can be efficiently utilized by the method for urging the movable second cam follower 6 using the plate spring 36 as compared with the method for urging the movable third cam follower 8 using the compression spring. Moreover, the flange 41 of the movable second cam follower 6 and the projections 43 of the plate spring 36 can realize a reliable lens barrel without a possibility of falling of the movable second cam follower 6.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the priority of Japanese Application No. 2005-041546, filed Feb. 17, 2006, which is hereby incorporated by reference herein in its entirety.

What is claimed is:

1. A lens barrel for transferring a lens holding member in a light axis direction via a cam follower engaged with a cam of a cam barrel, the lens barrel comprising:
   a guide portion of the lens holding member comprising a hole configured to guide the cam follower in a radial direction of the cam barrel;
   a tabular elastic member of the lens holding member configured to press the cam follower in a radial direction against the cam of the cam barrel by pressing against a flange unit located at an end of the cam follower; and
   a regulating member connected to the tabular elastic member and configured to limit movement of the cam follower in a direction opposite to the radial pressing direction of the tabular elastic member, the regulating member comprising one or more projections configured to be brought into contact with one or more surfaces of the guide portion when the tabular elastic member is pressed in the direction opposite to the radial pressing direction, thereby regulating movement of the tabular elastic member,
   wherein, when the tabular elastic member is not pressed in the direction opposite to the radial pressing direction, a clearance is defined between the one or more projections of the regulating member and the guide portion of the lens holding member.

2. The lens barrel according to claim 1,
   wherein the elastic member includes the regulating member, and
   wherein the engagement between the cam follower and the hole is maintained by the contact between the regulating member and the guide portion of the lens holding member.

3. The lens barrel according to claim 1,
   wherein the cam follower includes a first engaging portion engaged with the hole and a protrusion protruding from the first engaging portion in a direction orthogonal to the guiding direction of the hole.

4. The lens barrel according to claim 3,
   wherein the cam follower includes a second engaging portion engaged with the cam, the first engaging portion being located between the second engaging portion and the protrusion pressed by the elastic member.

5. The lens barrel according to claim 1, wherein the flange unit of the cam follower is configured to contact a surface of the guide portion of the lens holding member without passing through the hole in the guide portion, when pressed in the radial direction by the tabular elastic member.

6. The lens barrel according to claim 1, wherein the one or more projections of the regulating member are formed at an end of the tabular elastic member, and are configured to be brought into contact with one or more radially external surfaces of the guide portion of the lens holding member.

* * * * *